April 15, 1958 E. J. HADDOX 2,830,648
PROCESS AND APPARATUS FOR PRODUCING A GLASS FIBER MAT
Filed June 6, 1956 2 Sheets-Sheet 1
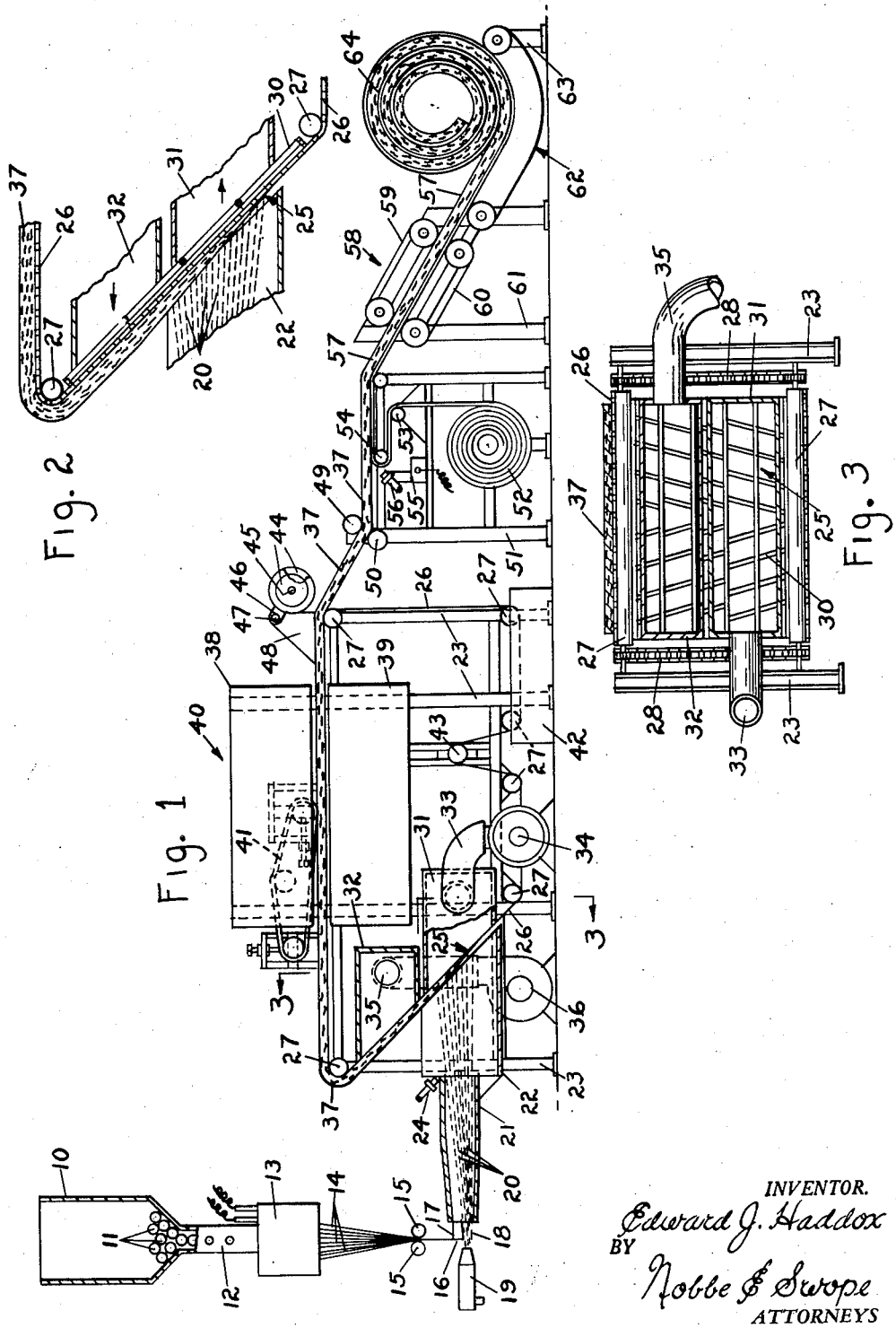

April 15, 1958      E. J. HADDOX      2,830,648
PROCESS AND APPARATUS FOR PRODUCING A GLASS FIBER MAT
Filed June 6, 1956      2 Sheets-Sheet 2
Fig. 4
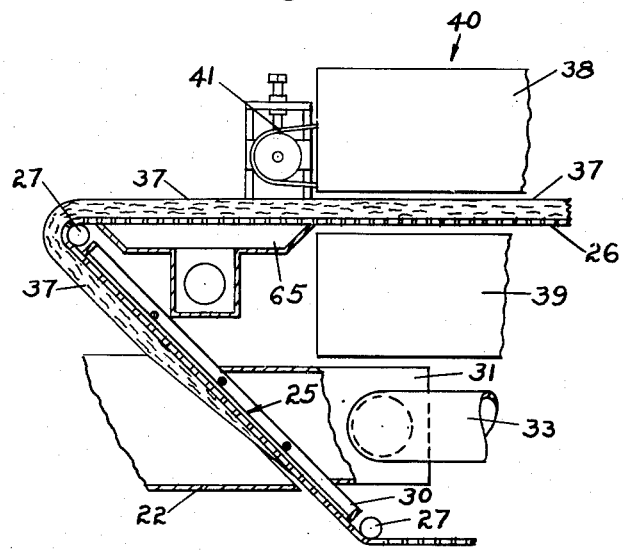
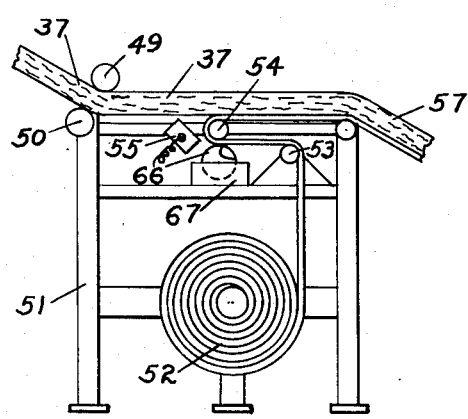
Fig. 5
INVENTOR.
Edward J. Haddox
BY
Nobbe & Swope
ATTORNEYS

United States Patent Office 2,830,648
Patented Apr. 15, 1958

2,830,648

PROCESS AND APPARATUS FOR PRODUCING A GLASS FIBER MAT

Edward J. Haddox, Defiance, Ohio, assignor to L. O. F. Glass Fibers Company, Toledo, Ohio, a corporation of Ohio Application June 6, 1956, Serial No. 589,630

10 Claims. (Cl. 154—27)

This invention relates broadly to fibrous insulation materials in mat form and more particularly to the production of glass fiber insulation materials in mat form which are of improved uniformity of thickness and density.

Glass fiber mats of low density provide efficient and easily installed insulation for use in domestic and commercial structures. Such mats are commonly made by attenuating primary glass filaments in a gaseous blast of intense heat and high velocity, which is effective to melt the primary filaments and draw them out into extremely fine fibers. The gaseous blast carrying the fine fibers is directed toward a movable, foraminous collection belt and the fibers are deposited thereon to build up a mat of desired thickness and density. A suction box is positioned behind the fiber collection surface of the foraminous belt to attract the fibers to the belt and retain the mat thereon. However, it has been found that in such method of operation it has been substantially impossible to produce low density mats of uniform thickness. The fibers contacting the collection belt at a high velocity tend to compact the mat. Also the suction box behind the collecting belt has the same effect. When the natural resiliency of the fibers is depended upon to fluff the mat back up to a desired thickness after it leaves the collection area, it has been found that mats of non-uniform thickness and consequent non-uniformity of density are provided.

Accordingly, it is an important object of the present invention to provide low density glass fiber mats of improved uniformity of thickness and density.

It is a further object to provide a process of and apparatus for the continuous production of low density glass fiber mats of improved uniformity of thickness and density.

Other objects and advantages of the invention will become more apparent during the course of the following description when taken in connection with the accompanying drawings.

In the drawings wherein like numerals are employed to designate like parts throughout the same;

Fig. 1 is a side elevation, with parts in section, of a machine for manufacturing mats of fibrous material;

Fig. 2 is an enlarged sectional elevation showing the collection area of the apparatus of Fig. 1 in detail;

Fig. 3 is a transverse sectional view taken on the line 3—3 of Fig. 1;

Fig. 4 is a side elevation of the machine of Fig. 1, showing a modified air pressure chamber; and Fig. 5 shows a modified form of applicator for distributing the laminating adhesive.

Referring now to the drawings and particularly to Fig. 1, the numeral 10 designates a hopper for a supply of glass marbles 11 which are gravitationally metered through the tube 12 into a melting pot 13 where they are reduced to a body of molten glass. The molten glass exudes through small holes or apertures in the bottom of the pot 13 in the form of primary filaments 14 which are drawn downwardly between a pair of rotatable pull rolls 15. The filaments are also aligned by the rolls 15 and pass on downwardly along a vertically disposed face 16 of a guide 17. A gaseous blast 18 of high velocity and intense heat, produced by an internal combustion-type burner 19, is directed toward the lower edge of the guide 17 and melts the downwardly moving ends of the filaments 14 to draw out or attenuate the filaments into very fine fibers 20. The blast 18 carries the fibers 20 in a slightly diverging horizontal path, as shown in Fig. 1, through an open-ended duct 21 connecting with an open-topped trough 22, both supported on a frame 23. A nozzle 24 directs a spray of thermosetting synthetic resin such as an aqueous suspension of phenolformaldehyde resin onto the fibers 20 as they pass along the trough 22. The resin coated fibers are deposited on the inclined collection surface 25 of a movable, continuous foraminous belt 26. The inclined collection surface 25 is positioned at the exhaust end of and overhangs the trough 22. The belt 26 is supported on rollers 27 which are mounted in suitable bearings secured to the frame 23. One or more of the rollers 27 are adapted to be driven by a motor or the like through chains 28 as shown in Fig. 3.

As best shown in Figs. 2 and 3, the inclined collection surface 25 of the belt 26 passes over a supporting grill 30, having a vacuum chamber 31 supported therebehind. The vacuum chamber 31 is connected by ducting 33 to a vacuum pump 34. The vacuum applied to the rear of the belt 26 in the collection area attracts the fibers 20 to the surface of the belt and retains the fibers against the belt to build up a mat 37 as the chain passes slowly in front of the grill 30. However, as pointed out hereinbefore, the velocity of the fibers in contacting the belt, connected with the action of the vacuum chamber 31, tends to unduly compact the fibers in the mat with the result that a mat of less than desired thickness is formed. When the natural resiliency of the fibers alone is depended upon to fluff the mat back to desired or greater than desired thickness, mats of non-uniform thickness and density are produced. Accordingly, to overcome these prior defects, there is provided in the present invention a pressure chamber 32, also mounted behind the grill 30, but spaced from the vacuum chamber 31. Said pressure chamber is connected by ducting 35 to a compressed gas generator 36, such as for example a fan, and is adapted to force air or other suitable gas through the belt 26 and to the underside and through the mat 37. The air applied to the underside of the mat by the pressure chamber 32 is applied at low velocity and pressure to fluff the mat, but is not sufficient to break the bond between the fibers, nor displace the fibers from the mat, nor displace the mat from the belt 26.

When so operating, it has been found that glass fiber mats of extremely low density such as in the range from 0.10 to 0.35 pound per cubic foot can be produced; and such mats are characterized by constant uniformity of thickness and density.

After passing up the inclined area 25, the belt 26 moves rearwardly in a horizontal plane between upper and lower sections 38 and 39 of an oven 40 to cure the resin previously deposited on the fibers of the mat 37. The upper section 38 of the oven 40 is supported by the frame 23 in parallel, spaced relation with respect to the top surface of the mat 37 and includes a continuous belt 41 which bears upon the top surface of the mat to compress it to the desired thickness. The lower section 39 of the oven is supported by the frame 23 in parallel, spaced relation with respect to the underside of the mat 37 and the belt 26. After passing through the oven 40 the belt 26 returns to the inclined collection area 25 after passing through a cleaning solution contained in a tank 42 and over a belt tensioning roll 43.

A plurality of slitters 44 for cutting the mat 37 into desired widths are rotatably journaled on a shaft 45 which is supported on pivot arms 46. The arms 46 are pivotally connected at 47 to gusset shaped plates 48 which extend upwardly from both sides of the frame 23 at the terminus of the horizontal run of the belt 26. The slitters 44 may be pivoted into and out of cutting position for slitting or trimming when desired, and may be moved longitudinally along the shaft 45 to trim the mat 37 to one or more strips of desired width.

After leaving conveyor belt 26, the cured mat 37 is threaded between a pair of spaced feed rolls 49 and 50, mounted for rotation on a lamination frame 51. Frame 51 supports a roll of backing paper 52 which is threaded over guide rolls 53 and 54 and by the latter is pressed against the underside of the mat 37. At this point a heater 55 is mounted beneath a battery of guns 56 to dry an adhesive, applied by the guns to the mat and paper to bond them together into a laminated mat 57.

A powered conveyor 58, comprising an upper link belt section 59 and an opposing, duplicate lower section 60, is supported at a downward angle on a frame 61. The conveyor 58 advances the mat 57 from the lamination frame 51 to a wind up unit 62. The frame 61 and an end frame 63 combine to support the powered wind up conveyor 62 to cradle the mat 57 and wind it into a package 64.

The speed of the belt 26 and conveyors 59, 60 and 62 are synchronized so that the mat will flow from one to another in a smooth manner without bunching or stretching.

In some instances as the mat 37 passes over the roller 27 between the collection area 25 and the oven 40, there is a tendency for the mat to be recompressed to some extent. To eliminate this problem, when it arises, a pressure chamber 65 may be substituted for the pressure chamber 32 and the air applied to the underside of the mat 37 in the horizontal run immediately preceding the oven 40. This structure is shown in Fig. 4.

Also when the end use of the laminated mat 57 does not require a continuous bond between the mat 37 and the paper 52, the apparatus may be modified as shown in Fig. 5. In this form, the adhesive applicator guns 56 are omitted and a plurality of doctor discs 66 are provided which distribute adhesive from a reservoir 67 onto the paper in longitudinally extending, spaced areas as the paper passes over the guide roll 54 prior to its juncture with the mat 37.

The present invention has been described as employing one pressure chamber positioned either behind the inclined collection surface 25 of the fiber collection belt 26 or beneath the horizontal run of the collection belt prior to its entry into the resin curing oven. However, it is also to be considered within the scope of the invention to employ simultaneously two pressure chambers, located in the positions indicated. Thus an initial treatment can be given the mat as it travels up the inclined collection surface, and then a second and final treatment can be given just prior to the point where the mat enters the resin curing oven.

Thus in accordance with the present invention there is provided an improved process of and apparatus for producing low density fibrous glass mats of constant uniformity of thickness and improved uniformity of density. Fibrous mats so produced provide greater uniformity of resistance to heat flow in an insulation situs and also contribute to more exact positioning in an insulation situs with the result that more uniform air spaces are provided on one or both sides of the mats when such are positioned in spaced relation with respect to the wall surfaces defining the spaces in which the mats are positioned. Also the uniformity of thickness of the mats provides a product of improved appearance and consequently greater sales appeal.

It is to be understood that the form of the invention herewith shown and described is to be taken as a preferred embodiment of the same, and various changes may be resorted to without departing from the spirit of the invention or the scope of the subjoined claims.

I claim:

1. The process of producing a low density glass fiber mat of uniform thickness, comprising providing a gaseous flow stream having fine glass fibers entrained therein, said fibers being coated with an uncured thermosetting synthetic resin bonding agent, interposing a foraminous fiber collection surface in said gaseous flow stream, creating a sub-atmospheric pressure zone adjacent said collecting surface to cause the fibers of said flow stream to be attracted to said collection surface, collecting said fibers as a mat on said collecting surface, moving the mat out of said sub-atmospheric pressure zone, applying super-atmospheric pressure to said mat through said collecting surface to thereby fluff the fibers of the mat to greater than desired thickness while retaining the integrity of the mat, and then compressing the mat to desired thickness and concomitantly curing the resin contained in the fibers.

2. The process of producing a low density glass fiber mat of uniform thickness, comprising providing a body of molten glass, withdrawing a molten stream from said body and forming the stream into a solidified glass filament, providing a gaseous blast of high velocity and intense heat, advancing an end of said filament into said blast to melt and attenuate said advancing end to a plurality of fine fibers and entrain the fibers in the blast, applying a coating of uncured thermosetting synthetic resin to the fibers while entrained in the blast, interposing a foraminous fiber collecting surface in the path of said fiber bearing blast, providing a zone of sub-atmospheric pressure adjacent said collecting surface to draw the fibers onto the surface, collecting said fibers as a mat on the collecting surface at said sub-atmospheric pressure zone, moving said collecting surface with the mat thereon away from said sub-atmospheric pressure zone and subjecting the fibers of the mat to a mono-directional flow stream of gas under super-atmospheric pressure to puff up the fibers of the mat to greater than desired thickness while retaining the integrity of the mat, then compressing the mat to desired thickness and concomitantly curing the resin on the fibers.

3. Apparatus for producing low density fibrous mats of uniform thickness and density, comprising means for producing a gaseous flow stream having fine fibers suspended therein, means for applying a bonding agent to the fibers while suspended in said stream, a foraminous fiber collecting means interposed in the path of said fiber-containing gaseous flow stream adapted to separate the fibers from the gaseous components and collect the fibers in continuous mat form, means positioned adjacent one surface of the collection means for blowing gas through the mat to expand the same to greater than finished thickness while retaining the integrity of the mat, and means for concomitantly curing the binder contained on the fibers of the mat while compressing the expanded mat to finished thickness.

4. Apparatus for producing low density glass fiber mats of uniform thickness and density, comprising means for producing a gaseous flow stream having fine glass fibers entrained therein, means for applying a coating of uncured binder to said fibers while entrained in said flow stream, means interposed in said flow stream for collecting the fibers in continuous mat form, means for creating a sub-atmospheric pressure adjacent said collecting means to cause the fibers of said flow stream to be attracted to said collecting means, means spaced from said sub-atmospheric pressure creating means for applying a gas under super-atmospheric pressure in mono-directional flow through said collecting means and mat to thereby fluff up the fibers of the mat to greater than desired thickness while retaining the integrity of the mat, and means for concomitantly compressing the fluffed mat to desired thickness and curing the resin contained on the fibers thereof.

5. Apparatus for producing low density fiber glass mats of uniform thickness and density, comprising means for producing a gaseous flow stream containing finely attenuated glass fibers suspended therein, means for applying a coating of a thermosetting synthetic resin bonding agent to the fibers while suspended in said stream, foraminous fiber collecting means interposed in the path of said fiber containing gaseous flow stream for separating the fibers from the gaseous component and collecting the fibers in continuous mat form, a compressed gas generator positioned adjacent one surface of the collecting means and adapted to blow gas through said collecting means and mat to expand the said mat to greater than finished thickness while the mat is retained on said collection means, and means for concomitantly curing the resin contained on the fibers of said mat while compressing the mat to finished thickness.

6. Apparatus for producing low density fiber glass mats of uniform thickness as defined in claim 4, wherein the compressed gas generator comprises a blower for forcing air at low pressure and velocity through the mat.

7. Apparatus for producing blanket-type fibrous insulation units of low density and uniform thickness having a continuous vapor barrier bonded to one face thereof, comprising means for producing a gaseous flow stream having fine fibers suspended therein, means for applying a coating of uncured bonding agent to the fibers while suspended in said stream, a foraminous fiber collecting surface interposed in the path of said fiber containing gaseous flow stream and adapted to separate the fibers from the gaseous component and collect the fibers in continuous mat form, a compressed gas generator positioned adjacent the collection surface and adapted to blow gas through the mat to expand the same to greater than finished thickness while retained on said collecting surface, means for compressing the expanded mat to finished thickness, means for concomitantly curing the binder contained on the fibers to bond the fibers together and provide a finished resilient mat of uniform thickness, means for applying a vapor barrier to one face of the finished mat including means for supplying a continuous vapor proof film, means for applying an adhesive to one face of said film, and means for positioning said adhesive coated surface of said vapor-proof film in smooth bonding contact with one face of the finished mat.

8. Apparatus for producing blanket-type insulation units of low density and uniform thickness from finely attenuated glass fibers and having a continuous vapor barrier bonded to one face thereof, comprising means for producing a gaseous flow stream containing finely attenuated glass fibers suspended therein, means for applying a coating of uncured thermosetting synthetic resin bonding agent to the fibers while suspended in said stream, foraminous fiber collecting means interposed in the path of said fiber containing gaseous flow stream and adapted to separate the fibers from the gaseous component and collect the fibers in continuous mat form, a compressed gas generator positioned adjacent one surface of the collecting means adapted to blow gas through the collecting means and mat to expand the said mat to greater than finished thickness while retaining the integrity of the mat, means for compressing the expanded mat to finished thickness, means for concomitantly curing the resin contained on the fibers of said mat to bond the fibers together and provide a resilient mat of uniform thickness, means for applying a continuous vapor barrier to one face of said mat including means for supplying a continuous vapor-proof film, means for applying an adhesive to one surface of said film, and means for positioning the adhesive coated surface of said vapor proof film in smooth bonding contact with one face of the finished mat.

9. The process of producing a fibrous mat of uniform thickness comprising the steps of, providing a gaseous flow stream having fibers entrained therein, coating said fibers with an unstabilized bonding agent while said fibers are entrained in said flow stream, collecting the coated fibers as a mat of uneven thickness, blowing a gas through said mat to expand it to greater than finished thickness while retaining the integrity of the mat, and recompressing the mat to a uniform thickness and concomitantly stabilizing the bonding agent contained on the fibers to thereby stabilize the structure of the mat.

10. The process of producing a fibrous mat of uniform thickness comprising the steps of, collecting a mass of fibers as an unstabilized mat of uneven thickness, blowing a gas through said mat to expand it to greater than finished thickness while retaining the integrity of the mat, recompressing the mat to a uniform thickness generally greater than the thickness at which said mat was collected, and concomitantly stabilizing the structure of the mat at said uniform thickness.

References Cited in the file of this patent

UNITED STATES PATENTS

| | | |
|---|---|---|
| 2,295,971 | Savidge | Sept. 15, 1942 |
| 2,604,427 | Armstrong et al. | June 22, 1952 |
| 2,728,699 | Labino | Dec. 27, 1955 |
| 2,744,044 | Toulmin | May 1, 1956 |
| 2,753,598 | Slayter | July 10, 1956 |
| 2,758,952 | Toulmin | Aug. 14, 1956 |